United States Patent
Wender (10) Patent No.: US 11,893,639 B2
(45) Date of Patent: *Feb. 6, 2024

(54) SYSTEM AND METHOD FOR PROCESSING A TRADE ORDER

(71) Applicant: Intercontinental Exchange Holdings, Inc., Atlanta, GA (US)

(72) Inventor: David R. Wender, New York, NY (US)

(73) Assignee: Intercontinental Exchange Holdings, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/113,263

(22) Filed: Feb. 23, 2023

(65) Prior Publication Data
US 2023/0196463 A1 Jun. 22, 2023

Related U.S. Application Data

(60) Continuation of application No. 17/833,312, filed on Jun. 6, 2022, now Pat. No. 11,620,708, which is a continuation of application No. 14/618,067, filed on Feb. 10, 2015, now Pat. No. 11,386,491, which is a division of application No. 14/175,274, filed on Feb. 7, 2014, now Pat. No. 10,657,592, which is a continuation of application No. 14/174,052, filed on Feb. 6, 2014, now Pat. No. 10,282,783.

(60) Provisional application No. 61/778,667, filed on Mar. 13, 2013.

(51) Int. Cl.
*G06Q 40/04* (2012.01)
*G06Q 40/06* (2012.01)

(52) U.S. Cl.
CPC .......... *G06Q 40/04* (2013.01); *G06Q 40/06* (2013.01)

(58) Field of Classification Search
CPC .................................................... G06Q 40/04
See application file for complete search history.

(56) References Cited

U.S. PATENT DOCUMENTS

| | | | |
|---|---|---|---|
| 5,454,104 A | 9/1995 | Steidlmayer et al. | |
| 7,177,833 B1* | 2/2007 | Marynowski | G06Q 40/03 705/37 |
| 7,574,397 B1 | 8/2009 | Kline et al. | |
| 8,660,940 B2 | 2/2014 | Marynowski et al. | |

(Continued)

OTHER PUBLICATIONS

Singapore Office Action dated Apr. 17, 2017 for corresponding Singapore Application No. 2014012447.

(Continued)

*Primary Examiner* — Jessica Lemieux
(74) *Attorney, Agent, or Firm* — DLA Piper LLP (US)

(57) ABSTRACT

Systems and apparatus for processing a trade order include a computer configured for receiving market data for a financial asset, receiving pricing parameters and receiving proposed order quantity and price data. The computer is further configured for constructing proposed trades based on the proposed order quantity and price data, and for calculating a theoretical price for the financial asset based on the market data, pricing parameters as well as the proposed order price data. In addition, the computer is configured for comparing the constructed trades with the theoretical price, and displaying market data indicators relative to the theoretical price indicators based on the comparison.

28 Claims, 3 Drawing Sheets

FIG. 1

(56) References Cited

U.S. PATENT DOCUMENTS

| | | |
|---|---|---|
| 2002/0178101 A1 | 11/2002 | Swift |
| 2003/0208430 A1 | 11/2003 | Gershon |
| 2003/0236737 A1 | 12/2003 | Kemp, II et al. |
| 2004/0039673 A1* | 2/2004 | Amberson ............. G06Q 40/06 705/36 R |
| 2004/0148247 A1 | 7/2004 | Miller et al. |
| 2006/0259417 A1 | 11/2006 | Marynowski et al. |
| 2007/0150389 A1 | 6/2007 | Aamodt et al. |
| 2008/0120217 A1* | 5/2008 | Amberson ............. G06Q 40/06 705/36 R |
| 2010/0138357 A1 | 6/2010 | Mufti-Bey |
| 2010/0228663 A1 | 9/2010 | Sreevijayan et al. |
| 2010/0332367 A1 | 12/2010 | Foygel et al. |
| 2011/0167023 A1 | 7/2011 | Gershon |
| 2012/0030087 A1 | 2/2012 | Marynowski et al. |
| 2013/0110695 A1 | 5/2013 | Domowitz et al. |
| 2016/0012533 A1 | 1/2016 | Marynowski et al. |

OTHER PUBLICATIONS

Canadian Office Action dated Aug. 9, 2017 for corresponding Canadian Application No. 2,842,636.

Singapore Office Action dated Aug. 8, 2018 for corresponding Singapore Application No. 2014012447.

Schwartz, Robert A., et al., "Next-Generation Securities Market Systems: An Experimental Investigation of Quote-Driven and Order-Driven Trading," Journal of Management Information Systems, Fall 1997, (Year: 1997).

* cited by examiner

SYSTEM AND METHOD FOR PROCESSING A TRADE ORDER

TECHNICAL FIELD

This disclosure is generally related to systems and apparatus for receiving and processing trade orders and more particularly to calculating and visually displaying the profitability and risk profile of a proposed trade to facilitate processing of a trade order.

BACKGROUND

Recent developments in derivatives trading have introduced a variety of complex trading possibilities for investors. The complexity of the financial instruments currently traded on the modern markets can make it difficult for an investor to make correct trading decisions. Currently, the available trading systems only provide a limited amount of information to the traders, such as the current market bid/ask of a financial asset. However, this information is often insufficient for informed trading decision-making.

Consequently, it is highly desirable to have a new type of a trade-processing system and method that would make it possible to evaluate the proposed trade by providing an investor with up-to-date profitability and delta risk information in a format that is easy to comprehend and that would enable the investor to make intelligent trading decisions.

SUMMARY

The present disclosure relates generally to a method and a system for processing a trade order. In one embodiment, at least one computer device may receive market data relating to a financial asset, at least one pricing parameter and proposed order quantity and price data. The at least one computer device may then construct a proposed trade based the order quantity and price data. The at least one computer device may further calculate a theoretical price based on the received market data, the at least one pricing parameter, and the proposed order price data. The at least one computer device may then compare the proposed trades with the theoretical price to assess profitability and display market data indicators relative to the theoretical price indicator.

In another embodiment, a system for processing a trade order may comprise executable instructions that generate a user graphical interface when the instructions are executed. The user interface may be configured to display one or more market data indicators relative to a theoretical price indicator. A theoretical price may be calculated based on a proposed order price, pricing parameters, and market data relating to a financial asset. Proposed price indicators may also be displayed and they may be based on the proposed order quantity and price. The relation between the market data indicators and the theoretical price indicator may be based on a comparison between the theoretical price and proposed trades.

In another embodiment, a system for trading financial instruments may comprise an electronic exchange server. The electronic exchange server may be configured to receive market data relating to a financial asset, at least one pricing parameter and proposed order quantity and price data. The electronic exchange server may further be configured to construct a proposed trade based on the order quantity and price data. The electronic exchange server may further be configured to calculate a theoretical price based on the received market data, the at least one pricing parameter, and the proposed order price data. The electronic exchange server may further be configured to compare the proposed trade with the theoretical price to assess profitability and display market data indicators relative to the theoretical price indicator.

BRIEF DESCRIPTION OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings.

DETAILED DESCRIPTION

The present disclosure relates generally to systems and methods for processing trade orders after receiving proposed trade information, market data and pricing parameters. Proposed trades may be constructed based on the proposed trade information. A theoretical price may then be calculated based on the market data and the pricing parameters. Each of the proposed trades may then be compared to the theoretical price. The theoretical price and the market prices may then be displayed relative to each other based on the comparison in order to visually demonstrate trade profitability.

The term "electronic exchange server" shall refer to any type of a computing device. The electronic exchange server may comprise one or more processors configured to execute instructions stored in a non-transitory memory. The electronic exchange server may be configured to place orders in connection with financial instruments over a network when the instructions are executed. An electronic exchange server may be embodied on a single computing device, while in other embodiments, an electronic exchange server may refer to a plurality of computing devices housed in one or more facilities that are configured to jointly provide local or remote computing services to one or more users or user devices. The electronic exchange server may send and receive data from user devices, data servers, or any other type of computing devices or entities over the Internet, over a Wi-Fi connection, over a cellular network or via any other wired or wireless connection or network known in the art.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with an electronic exchange system, such as, for example, any public and/or private networks, including, for instance, the Internet, an intranet, or an extranet, any wired or wireless networks or combinations thereof The term "asset" shall refer to any type of financial instrument, such as, without limitation, outright options, spread options, option combinations, commodities, derivatives, shares, bonds and currencies. The term "derivatives" shall further refer to any type of options, caps, floors, collars, structured debt obligations and deposits, swaps, futures, forwards and various combinations thereof or any other type of financial instruments that derive from another underlying financial instrument.

The term "trade" shall refer to any type or part of a transaction or exchange that may occur in connection with one or more finical instruments.

The term "user interface" shall refer to any suitable type of device, connection, display and/or system through which information may be conveyed to a user, such as, without limitation, a monitor, a computer, a graphical user interface, a terminal, a screen, a telephone, a personal digital assistant, a smartphone, or an interactive television.

The term "theoretical model" shall refer to any commercially known or customized models configured for valuation purposes, including, without limitation and for illustration purposes only, any of the following models: Black-Scholes model, Black model, Binomial options pricing model, Monte Carlo option model, Finite difference methods for option pricing model, Heston model, Heath-Jarrow-Morton framework, Variance Gamma Model and any other theoretical valuation model known in the art.

The term "market data" shall refer to any data representative of any current or historic market attributes of a financial asset. For example, market data may comprise market bid data, market ask data, market bid volume data or any other financial data related to a financial asset.

The term "pricing parameters" shall refer to any type of data that can be utilized to price a financial asset. For example, pricing parameter may comprise risk-free interest rate data, volatility data, time to option expiration data, skew data, kurtosis data, correlation data, interest rate data, dividend yield data, forward price data relating to an underlying asset or any other type of financial data.

The term "electronic exchange" shall refer to any device, system or venue that is capable of carrying out electronic asset exchange transactions. For example, electronic exchange may refer to a commodities exchange, a futures execution facility, an options exchange, a cash equities exchange, a swap execution facility, an unregulated electronic transaction execution venue or any other type of an exchange venue known in the art.

Trade Order Processing Method

In a first exemplary embodiment, the present disclosure relates to a method of processing a trade order by a computer comprising a non-transitory memory for storing instructions and a processor for executing the instructions to perform certain functions. In one embodiment, the computer may be an electronic exchange server. The computer may be configured to receive and send data to and from user devices and other servers over the Internet, over a Wi-Fi connection, over a cellular network or via any other wired or wireless connection or network known in the art.

As an initial step, the exemplary method may include receiving market data for at least one type of a financial asset traded on an electronic exchange. In one embodiment, the financial asset may be selected by a user, while in other embodiments, the financial asset may be selected automatically by a computer. The market data may be received from open market sources, private market sources, internal sources, an external market data server or from any other source.

As a next step, the exemplary method may include receiving at least one pricing parameter. The pricing parameters may be received from open information sources, private market sources, internal sources, an external pricing parameter data server or from any other source.

The exemplary trade processing method may further include receiving a proposed order quantity and a proposed order price relating to the financial asset. Optionally, the proposed order price and the proposed order quantity may be selected via user interactions with a graphical user interface, however, other methods of receiving the proposed order quantity and the proposed order price may also be used. For example, the user may select the proposed order price by selecting, via a user interface, a live market bid or live market ask pertaining to the financial asset.

Once the proposed order quantity and the proposed order price are received, the computer may construct one or more proposed trades based on this data. In one embodiment, the proposed trades may comprise a trade based on the proposed order price and quantity. In another embodiment, additional trades may be constructed that use the proposed order quantity, but use current market ask or market bid prices pertaining to the selected financial asset instead of the proposed order price. In another embodiment, the trades may be constructed using the proposed order quantity and the proposed order price in other ways known in the art.

Next, the exemplary trade processing method may include calculating, by the computer, a theoretical price of the financial asset. Optionally, a theoretical model may be used to calculate the theoretical price. The theoretical model may, for example, comprise one or more of the Black-Scholes model, Black model, Binomial options pricing model, Monte Carlo option model, Finite difference methods for option pricing model, Heston model, Heath-Jarrow-Morton framework, Variance Gamma Model or any other theoretical valuation model known in the art. The theoretical model may be selected by the user. Alternatively, the theoretical model may be determined by the computer. Notably, one or more pricing parameters may be used as inputs to the theoretical model. The theoretical price may also be calculated by using at least one of the received market data and/or proposed order price data as an input to the theoretical model. In one embodiment, the received market data, the pricing parameters, and/or the proposed order price data may all be used as inputs for the theoretical model. In another embodiment, the step of calculating the theoretical price may also include calculating the implied volatility of the financial asset. The volatility may be calculated by using a theoretical model or by other methods known in the art.

In one embodiment, where the financial asset is a derivative, the step of calculating the theoretical price may include calculating the theoretical price based on a mid-pint of a bid market price and an ask market price of an underlying asset of the financial asset. The step of calculating the theoretical price may also include calculating a theoretical buying price based on the proposed order price being a proposed buying price. In this embodiment, the theoretical buying price may be calculated based, in part, on the value of the underlying asset that may be used as a hedge for the purchase of the financial asset. The step of calculating the theoretical price may also include calculating a theoretical selling price based on the proposed order price being a proposed selling price. In this embodiment, the theoretical selling price may be calculated based, in part, on the value of the underlying asset that may be used as a hedge for the sale of the financial asset. For example, if the financial asset is a call option, the theoretical buying price may be based, in part, on a bid market price of the underlying asset of the call option. In this example, the purchase of the underlying asset may acts as a hedge to the purchase of the call option. Consequently, in this example, the price of the underlying asset may affect the theoretical buying price of the financial asset.

Once the theoretical price is calculated, the exemplary method may further include comparing the proposed trades with the calculated theoretical price. The comparison may be accomplished, for example, by juxtaposing the theoretical price against the price of the proposed trades. The comparison may demonstrate the profitability of each of the proposed trades. For example, if a proposed trade includes a buy order, the proposed trade may be determined to be profitable if the price of the proposed trade is lower than the theoretical price. In another example, where a proposed trade includes a sell order, the proposed trade may be determined to be profitable if the price of the proposed trade price is higher than the theoretical price. Other methods of comparing the prices known in the art may also be used.

The exemplary trade processing method may optionally include displaying a theoretical price indicator and market data indicators. These indicators may be displayed on a user interface or on any type of display including, without limitation, a computer monitor, a smart-phone screen, a laptop screen or any other type of device capable of displaying images. This exemplary trade processing method may also include displaying a proposed order quantity indicator and a proposed order price indicator that reflect the proposed order quantity and price relative to the theoretical price. Notably, the proposed order price indicator may overlap one of the market data indicators.

In one embodiment, the theoretical price indicator may be displayed in a way that also visually indicates the theoretical buying price and the theoretical selling price. In one embodiment, the theoretical price indicator may comprise a centered mark based on a calculation of the theoretical price versus the midpoint of the bid/ask market price of an underlying asset of the financial asset. The theoretical price indicator may also comprise a mark indicating the theoretical buying price and a mark indicating the theoretical selling price.

In another embodiment, the theoretical price indicator may be displayed in a way that also visually indicates the calculated implied volatility of the financial asset. For example, the theoretical price indicator may comprise two volatility marks (e.g., displayed as price marks) indicative of a range of values of the bid/ask spread of the financial asset. The distance between the two volatility marks may be visually indicative of the delta risk of the financial asset. Optionally, the theoretical price indicator may comprise a centered mark indicating the theoretical price and two volatility marks to either side of the centered mark indicating the delta risk of the financial asset.

The theoretical price indicator may reflect and be based on the calculated theoretical price, while the market data indicators may reflect and be based on the proposed trade prices. Optionally, the market data indicators may be displayed relative to the theoretical price indicator so as to illustrate the comparison between the theoretical price and the proposed trade prices. In one embodiment, the theoretical price indicator may be displayed statically as a centered mark (such as a bar, a point, a rectangle or any other type of a mark) in, or near, the middle of the user interface. In such an embodiment, the market data indicators may be displayed to the left or to the right of the centered mark. In an alternative embodiment, the market data indicators may be displayed above or below the centered mark. The indicators displayed to the left or below the centered mark may represent prices that are below the theoretical price, whereas the indicators displayed to the right or above the centered mark may represent prices that are above the theoretical price. In another embodiment, each of the market data indicators may include a text box that includes current market price and volume data.

In yet another embodiment, the location of each of the displayed market data indicators may be updated dynamically in response to changes in the live market data. For example, each of the market data indicators may comprise a mark (or any other graphical indicator) that moves to the left or to the right as the live market data is updated or as the theoretical price is updated. In an alternative embodiment, the market data indicators may move up and down as the theoretical price is updated. Optionally, the location of the market data indicators (relative to the theoretical price indicator) may indicate whether a trade is profitable or not. The position of the market data indicators may also indicate the extent to which the trade are profitable. For example, if a trade includes a buy order, the location of a market data indicator associated with a market ask price can indicate that the trade is profitable if that market data indicator is displayed on a particular side of the theoretical price indicator. In this example, the distance of the market data indicator from the theoretical price indicator may indicate the extent of profitability.

Dynamic changes in the positions of the market data indicators discussed above may be based on live fluctuations of market data, such as fluctuations in one or more of the market bid data, market ask data, market bid volume and market ask volume. Dynamic changes in the positions of the market data indicators discussed above may also be based on the changes in pricing parameters. Changes in other types of market data known in the art may also affect the dynamic changes in positions of the market data indicators.

Optionally, the user interface displaying the theoretical price indicator and the market data indicators may comprise a graphical user interface. The graphical user interface may be configured to display the theoretical price indicators and the market data indicators, as well as to allow a user to select one of the proposed trades for execution. For example, the graphical user interface may comprise a button associated with each proposed trade. Once a user selects one of the proposed trades, that proposed trade may be executed by the computer. In another embodiment, the graphical user interface may be configured to prevent the user from selecting a trade that is currently determined to be unprofitable. For example, a button associated with initiating an unprofitable proposed trade may be grayed out, or otherwise made inaccessible. In yet another embodiment, the graphical user interface may be configured to enable a user to override the prevention of the selection of the unprofitable proposed trade. For example, each disabled button may have an associated override checkbox. The override checkbox may re-activate the disabled button. Other methods of overriding the prevention may also be used.

The graphical user interface may also be configured to allow the user to select a proposed trade that does not correspond to the proposed order price. For example, the graphical user interface may comprise buttons associated with live market bid and live market ask data. In one embodiment, the user may be able to request a trade at the current market ask price or at the current market bid price, even if the user originally proposed a price that does not correspond to one of the current market prices. In another embodiment, the buttons associated with the proposed trades that are currently profitable may be highlighted in a way that makes the buttons distinct from other buttons. Other ways to highlight the profitable trades may also be used. In another embodiment, the buttons associated with proposed trades that do not correspond to the proposed order price may be made inaccessible if that trade is determined to be unprofitable.

Trade Order Processing Device

In accordance with the present disclosure, a computer for processing a trade order for an asset traded on an electronic exchange may comprise one or more processors for executing computer executable instructions. Execution of these instructions may cause the computer to generate a graphical user interface configured to display elements discussed above and/or further described below. The graphical user interface may be configured to be displayed on any type of a display device, including a computer monitor, a smartphone screen, a laptop screen or any other type of device capable of displaying images.

The graphical user interface may be configured to display a theoretical price indicator and market data indicators associated with a financial asset traded on an electronic exchange. In one embodiment, the graphical user interface may also be configured to display a proposed order quantity indicator and a proposed order price indicator that reflect the proposed order quantity and price relative to the theoretical price indicator and the market data indicators. Notably, the proposed order price indicator may overlap one of the market data indicators. For example, the graphical user interface may be configured to display the proposed order price indicator as overlapping the proposed order price indicator corresponding to the live market ask data or the live market bid data.

In one embodiment, the graphical user interface may further be configured to display the theoretical price indicator a way that also visually indicates a theoretical buying price and a theoretical selling price. In one embodiment, the graphical user interface may be configured to display the theoretical price indicator as comprising a centered mark based on a calculation of the theoretical price versus a midpoint of the bid/ask market price of an underlying asset of the financial asset. The theoretical price indicator may also comprise a mark indicating a calculated theoretical buying price and a mark indicating a calculated theoretical selling price. In one embodiment, the theoretical buying price and the theoretical selling price may be calculated based, in part, on a price of an underlying asset of the financial asset that is bought or sold to hedge the sale or purchase of the financial asset.

Optionally, the graphical user interface may further be configured to display the theoretical price indicator in a way that visually indicates a calculated implied volatility of a financial asset. For example, the graphical user interface may be configured to display the theoretical price indicator that comprises two volatility marks (e.g., displayed as price marks) defining a range of values based on a bid/ask spread of a financial asset. In yet another embodiment, the distance between the two volatility marks on the graphical user interface may visually indicate a delta risk of the financial asset. In one embodiment, the graphical user interface may be configured to display the theoretical price indicator statically. For example, the theoretical price indicator may be displayed as a centered mark (such as a bar, a point, a rectangle or any other type of a mark) in, or near, the middle of a graphical display.

The graphical user interface may also be configured to display market data indicators relative to the theoretical price indicator. The relationship between these indictors may be based on the comparison between the theoretical price and each of the proposed trades. In this embodiment, the graphical user interface may be configured to update the location of the displayed market data indicators dynamically in response to changes in the live market data or in the value of the theoretical price. For example, each of the market data indicators may comprise a mark (or any other graphical indicator) that moves to the left or to the right (or up and down) as the live market data is updated, or as the theoretical price is updated.

Notably, the location of the market data indicators relative to the theoretical price indicator may indicate whether the trade is profitable or not. The position of the market data indicators may also indicate the extent to which the trade are profitable. For example, if a trade comprises a buy order, the location of a market data indicator associated with a market ask can indicate that the trade is profitable if that market data indicator is displayed on a particular side of the theoretical price indicator. In this example, the distance of the market data indicator from the theoretical price indicator may visually indicate the extent of the profitability.

The graphical user interface may also be configured to display dynamic changes in the position of the market data indicators based on live fluctuations of the market data. In yet another embodiment, the graphical user interface may be configured to display each of the market data indicators as comprising a text box that includes current market price data and/or volume data.

The graphical user interface may further be configured to receive input from a user to select a proposed trade for execution. For example, the graphical user interface may comprise a selection button associated with each proposed trade. Once the user, via the selection button, selects one of the proposed trades, the selected proposed trade may be executed by the computer. In another embodiment, the graphical user interface may be configured to prevent the user from selecting a trade that is currently determined to be unprofitable. For example, a selection button associated with an unprofitable proposed trade may be grayed out, or otherwise made inaccessible. In yet another embodiment, the user interface may be configured to enable a user to override the prevention of the unprofitable proposed trade. For example, each disabled selection button may have an associated override checkbox. The override checkbox may re-activate the disabled selection button. Other methods of overriding the prevention may also be used.

In one embodiment, the user interface may be configured to receive input from a user to select a proposed trade that does not correspond to the proposed order price. For example, the graphical user interface may comprise selection buttons associated with the live market bid data and the live market ask data. Thus, at any time, the user can chose (via one or more selection buttons) to buy at the current ask price or sell at the current bid price, even if the user originally proposed a price that does not correspond to one of the current market prices. In another embodiment, the selection buttons associated with the proposed trades that are currently profitable may be highlighted in a way that makes the buttons distinct from other buttons. Other ways to highlight the profitable trades may also be used.

Trade Order Processing System

An exemplary computer system for processing a trade order in accordance with the present disclosure may comprise an electronic exchange server. The electronic exchange server may comprise processors configured to execute instructions stored in a non-transitory memory. Execution of the instructions may cause the electronic exchange server to perform any of the features described above, and those further described below. An electronic exchange server may be embodied on a single computing device, while in other embodiments, the electronic exchange server may refer to a plurality of computing devices housed in one or more facilities that are configured to jointly provide computing services to remote devices. The electronic exchange server may further be configured to receive and send data to and from user devices and other servers over the Internet, over a Wi-Fi connection, over a cellular network or via any other wired or wireless connection or network.

The electronic exchange server may be configured to receive market data for a financial asset. In one embodiment, the financial asset may be selected by a user, while in other embodiments, the financial asset may be selected automatically by the electronic exchange server. The electronic exchange server may be configured to receive market data from open market sources, private market sources, internal sources, an external market data server or from any other source. The electronic exchange server may further be configured to receive at least one pricing parameter. The pricing parameter may be received from open information sources, private market sources, internal sources, an external pricing parameter data server or from any other source.

The electronic exchange server may further be configured to receive a proposed order quantity and a proposed order price relating to the financial asset. Optionally, the proposed order quantity and the proposed order price may be selected via the user interactions with a graphical user interface, however, other methods of receiving the proposed order quantity and the proposed order price may also be used. For example, the user may select, via a graphical user interface, the proposed order price by selecting a displayed market bid or market ask pertaining to the financial asset.

Once the proposed order quantity and the proposed order price are received, the electronic exchange server may be configured to construct one or more proposed trades based on this data. In one embodiment, the proposed trades may comprise a trade based on the proposed order price. In another embodiment, the electronic exchange server may be configured to construct additional trades based on the proposed order quantity using current market ask or market bid prices pertaining to the financial asset as the proposed order price.

The electronic exchange server may also be configured to calculate a theoretical price of the financial asset. Optionally, a theoretical model may be initiated and used by the electronic exchange server to calculate the theoretical price. The theoretical model may be selected by the user. Alternatively, the theoretical model may be selected by the electronic exchange server. Notably, the theoretical price may be calculated by using one or more of the pricing parameters, and received market data as inputs to the theoretical model. In one embodiment, the electronic exchange server may be further configured to calculate the theoretical price by also calculating an implied volatility of the financial asset. The volatility may be calculated by using a theoretical model or by any other method known in the art.

In one embodiment, where the financial asset is a derivative, the electronic exchange server may also be configured to calculate a theoretical buying price based on the proposed order price being a proposed buying price. In this embodiment, the electronic exchange server may be configured to calculate the theoretical buying price based, in part, on the value of the underlying asset that may be used as a hedge for the purchase of the financial asset. The electronic exchange server may also be configured to calculate the theoretical selling price based on the proposed order price being a proposed selling price. In this embodiment, the electronic exchange server may be configured to calculate the theoretical selling price based, in part, on the value of the underlying asset that may be used as a hedge for the sale of the financial asset.

Optionally, the electronic exchange server may also be configured to compare the proposed trades with the calculated theoretical price. The electronic exchange server may be configured to perform this comparison by juxtaposing the theoretical price against the price of the proposed trades. The comparison may yield an indication of profitability of the proposed trades.

Still further, the electronic exchange server may be configured to generate and display a theoretical price indicator and market data indicators. In one embodiment, the electronic exchange server may be configured to generate a graphical user interface and to display these indicators on said graphical user interface. The theoretical price indicator may be based on the calculated theoretical price and the market data indicators may be based on the received market data. Optionally, the electronic exchange server may be configured to display the theoretical price indicator in a way that visually indicates the calculated implied volatility of the financial asset. For example, the theoretical price indicator may comprise two volatility marks indicative of a range of values based on a bid/ask spread of the financial asset. In another embodiment, the theoretical price indicator may comprise a mark indicative of the calculated theoretical buying price and a mark indicative of the calculated theoretical selling price. In yet another embodiment, the distance between the two volatility marks may visually indicate the delta risk of the financial asset.

Additionally, an electronic exchange server may according to this disclosure be further configured to generate and display each of the market data indicators relative to the theoretical price indicator so as to illustrate the comparison between the theoretical price and the proposed trade prices. In one embodiment, the theoretical price indicator may be displayed statically as a centered mark in, or near, the middle of a user interface display. In such an embodiment, the locations of the displayed market data indicators may be updated dynamically in response to changes in the live market data or in the value of the theoretical price. For example, each of the market data indicators may be displayed, by the electronic exchange server, as comprising marks (or any other graphical indicators) that move to the left or to the right (or up and down) of the centered theoretical price indicator. Optionally, the locations of the market data indicators may indicate whether each of the proposed trade is profitable or not. The positions of the market data indicators may also indicate the extent to which each of the proposed trades is profitable.

Notably, dynamic changes in the positions of the market data indicators discussed above may be based on live fluctuations of market data. The electronic exchange server may also be configured to display the market data indicators as comprising text bars that may include current market bid data and/or market bid volume data, or current market ask data and/or market ask volume data.

The electronic exchange server may be further configured to generate and display a proposed order quantity indicator and a proposed order price indicator that reflect the proposed order quantity and price relative to the theoretical price indicator and the market data indicators. Notably, the proposed order price indicator may overlap one of the market data indicators.

In yet another embodiment, the electronic exchange server may be configured to generate and/or display the theoretical price indicator and the market data indicators via a graphical user interface. The graphical user interface may be generated by or independently of the electronic exchange server. This graphical user interface may be configured with one or more of the features discussed above. For example, the graphical user interface may be configured to receive input from a user to select one of the proposed trades for execution. Once the user selects a proposed trade, that proposed trade may be executed by the electronic exchange server. Further, the graphical user interface may be configured to prevent the user from selecting a trade that is currently determined to be unprofitable and/or enable a user to override the prevention of the selection of the unprofitable proposed trade. The user interface may be configured to receive input from a user to select a proposed trade that does not correspond to a proposed order price. Thus, at any time, a user may be permitted to buy at a current ask price or sell at a current bid price, even if the user originally proposed a price that does not correspond to one of the current market prices.

Exemplary User Interface for Processing Trade Orders

Figure 1:
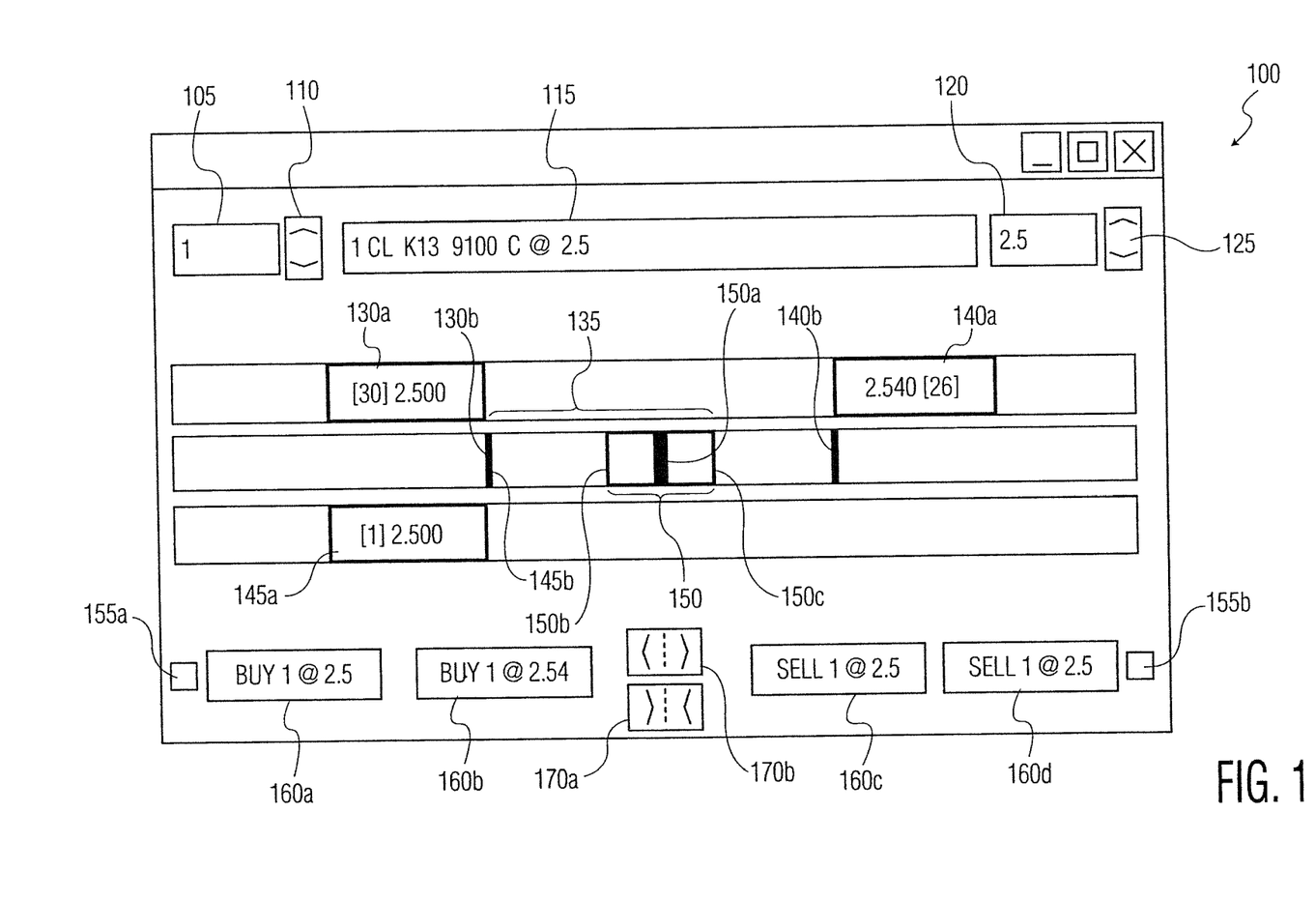
FIG. 1 is a diagram illustrating an exemplary user interface for processing trade orders.

Turning now to FIG. 1, an exemplary graphical user interface 100 for processing a trade orders is shown. The graphical user interface 100 may be displayed on any type of display device including a computer monitor, a smartphone screen, a laptop screen or any other type of device capable of displaying images.

The graphical user interface 100 may comprise a proposed order quantity text box 105 and proposed order quantity selection arrows 110. The graphical user interface 100 may be configured to receive input in the form of a proposed order quantity typed directly into the text box 105, which may be modified by pressing the proposed order quantity selection arrows 110. The graphical user interface 100 may further comprise a proposed order price text box 120 and proposed order price selection arrows 125. The graphical user interface 100 may be configured to receive input in the form of a proposed order price typed directly into the text box 120, which may be modified by pressing the proposed order price section arrows 125.

The exemplary graphical user interface 100 comprises a financial asset indicator text box 115. The financial asset indicator text box 115 may show the name of the financial asset to be traded, the proposed order quantity and the proposed order price. For example, in this embodiment, the trade indicator text box 115 is indicating that the financial asset "CL K13 9100 C" is to be traded at "2.5$" and that that the order quantity is "1."

The exemplary graphical user interface 100 also comprises a theoretical price indicator 150. As discussed above, the theoretical price indicator may have been calculated based on the proposed price, market information related to a financial asset and/or the pricing parameters. In this embodiment, the theoretical price indicator 150 comprises a centered mark 150a. The centered mark may remain static for the duration of the trade order processing. The theoretical price indicator 150 also comprises a range of values represented by a distance between a bar indicative of a theoretical buying price 150b and a bar indicative of a theoretical selling price 150c on either side of the centered mark 150a. This range of values may reflect the theoretical values of the financial asset valued against the appropriate bid or ask of an underlying asset of the financial asset that may be used to hedge the delta risk of a sale or purchase of the financial asset . This range of values may further reflect the delta risk of the financial asset.

Also included in this graphical user interface 100 are market data indicators 130a and 140a. The market data indicators 130a, 140a may represent proposed trades. The proposed trades may have been constructed based on the methods discussed above. In this embodiment, a first market data indicator 130a is indicative of the current live market bid of the financial asset. This market data indicator 130a comprises a bar 130b that may dynamically change its position relative to the centered mark 150a of the theoretical price indicator 150. The distance 135 between the bid bar 130b and the theoretical selling price bar 150c may be indicative of how profitable or unprofitable it is to sell the financial asset at the current bid. In this embodiment, the bid bar 130b is displayed to the left of the theoretical selling price bar 150c showing that the bid price is lower than the theoretical selling price. Consequently, the graphical user interface 100 is indicating that it is currently unprofitable to sell the financial asset at the bid price. In other embodiments, the bid bar 130b may be displayed to the right of the theoretical selling price bar 150c indicating that it is profitable to sell at the bid price. The market data indicator 130a may display the current market bid price ("2.500" in this embodiment) and the volume of the current market bid price ([30] in this embodiment).

A second market data indicator 140a is indicative of the current live market ask of the financial asset. The market data indicator 140a comprises a bar 140b that may dynamically change its position relative to the centered mark 150a of the theoretical price indicator 150. The distance between the bar 140b and the theoretical buying price bar 150b may be indicative of how profitable or unprofitable it is to buy at the current ask. In this embodiment, the ask bar 140b is displayed to the right of the theoretical buying price bar 150b indicating that the ask price is currently higher than the theoretical price. Consequently, it is currently unprofitable to buy at the ask price. In other embodiments, the ask bar 140b may be displayed to the left of the theoretical buying price bar 150b indicating that it is profitable to buy at the ask price. The market data indicator 140a may display the current market ask price ("2.540" in this embodiment) and the volume of the current market ask ([26] in this embodiment). It is also possible to display the bars 130b, 140b at other locations relative to the centered mark 150a and the theoretical price bars 150b, 150c. For example, the bars 130b, 140b may be displayed above or below the centered mark 150a.

The graphical user interface 100 in this exemplary embodiment also comprises a proposed order indicator 145a. The proposed order indicator 145a is indicative of the proposed order quantity and price. The proposed order indicator 145a may comprise the proposed quantity ([1] in this embodiment) and price ("2.5" in this embodiment). Since the proposed price is often based on the current bid data or ask data, the proposed order indicator 145a may be indicative of the same price value as one of the market data indicators 130a, 140a. In the embodiment shown by the FIG. 1, the proposed order indicator 145a is indicative of the same price value as the bid market data indicator 130a. In other embodiments, the proposed order indicator 145a may be indicative of any price value. For example, the proposed order indicator 145a may be indicative of any price value entered by the user in the text box 120. The proposed order indicator 145a comprises a bar 145b that may dynamically change its position relative to the centered mark 150a of the theoretical price indicator 150. In the shown embodiment, the proposed price bar 145b overlaps with the bid bar 130b of the bid market data indicator 130a. The bars 145b and 130b overlap because the market data indicator 130a and the proposed order indicator 145a are both indicative of the same price value ("2.5"). However, in other embodiments, the proposed price bar 145b may be located at any location on the screen relative to the theoretical price indicator 150.

In this embodiment, the proposed order indicator bar 145b is displayed to the left of the theoretical buying price bar 150b indicating that it is profitable to buy at the proposed order price. In other embodiments, the proposed order indicator bar 145b may be displayed to the right of the theoretical selling price bar 150c indicating that it is profitable to sell at the proposed order price. In still other embodiments, the proposed order indicator bar 145b may be displayed between or on the theoretical buying price bar 150b and theoretical selling price bar 150c indicating that it is not profitable to buy at the proposed order price and that is not profitable to sell at the proposed order price. It is also possible to display the proposed order indicator bar 145b at other locations relative to the centered mark 150a and the theoretical price bars 150b, 150c. For example, the proposed order indicator bar 145b may be displayed above or below the centered mark 150a.

The graphical user interface 100 also comprises several trade buttons 160a, 160b, 160c, 160d. Each of the buttons 160a, 160b, 160c, 160d may correspond to a proposed order or to the market data. In this embodiment, button 160a enables the user to place a buy trade order at the proposed price, by clicking or selecting the button 160a. The button 160d enables the user to place a sell trade order at the proposed price, by clicking or selecting the button 160d. The button 160b enables the user to place a buy trade order at the live market ask price, by clicking or selecting the button 160b. The button 160c enables the user to place a sell trade order at the live market bid price, by clicking or selecting the button 160c.

In one embodiment, each of the buttons 160a, 160b, 160c, 160d that corresponds to a trade that is not profitable may be disabled by the graphical user interface 100. For example, these buttons may appear dimmed or grayed-out. The user would be unable to click the disabled button to place an unprofitable trade. In another embodiment, each of the buttons 160a, 160b, 160c, 160d that corresponds to a trade that is currently profitable may be highlighted by the interface, for example, such buttons may change their colors and/or the intensity of their colors or begin flashing. In yet another embodiment, the graphical user interface 100 may also comprise override means such as checkboxes 155a and 155b that allow the user to re-enable the buttons that correspond to the unprofitable trades. In this embodiment, the user may re-enable the buy buttons 160a, 160b by checking the checkbox 155a. The user may also re-enable sell buttons 160c, 160d by checking the checkbox 155b.

The graphical user interface 100 also comprise zoom buttons 170a and 170b. In one embodiment, the theoretical price indicator 150 may remain centered in the middle of the graphical user interface 100 regardless of the level of zoom. The zoom-in button 170a may enable the user to increase the distance between the market data indicators 130a, 140a and the theoretical price indicator 150. The zoom-out button 170b may enable the user to decrease the distance between the market data indicators 130a, 140a and the theoretical price indicator 150. However, in both cases, the distances of the market data indicators 130a, 140a to the theoretical price indicator 150 will remain proportional and indicative of the profitability of the proposed trades.

Exemplary System for Processing Trade Orders

Figure 2:
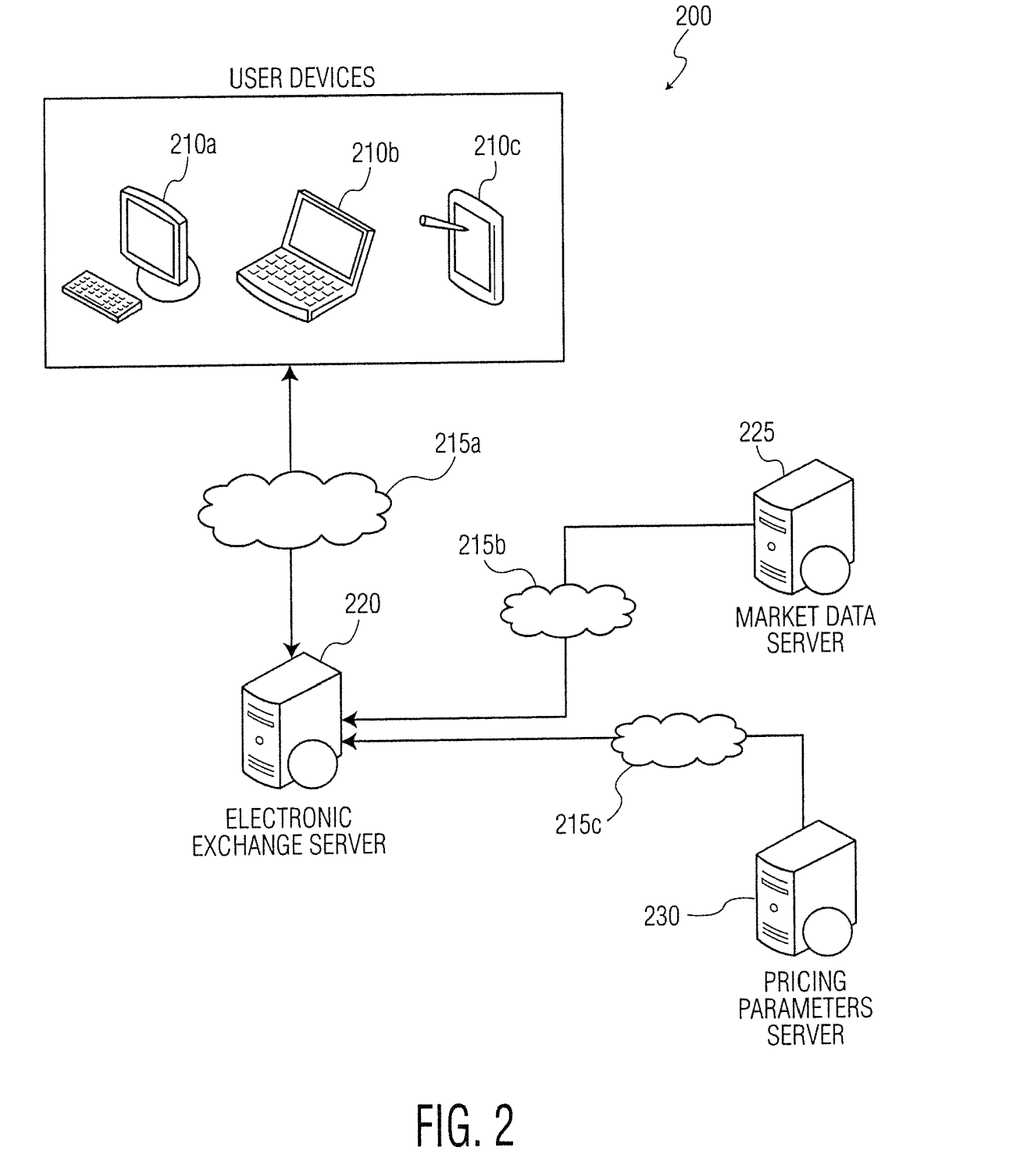
FIG. 2 is a block diagram illustrating an exemplary system for processing trade orders.

Turning now to FIG. 2, an exemplary system 200 configured for processing a trade according to this disclosure is shown. The system 200 comprises an electronic exchange server 220, market data server 225, pricing parameters server 230 and user devices 210a, 210b, 210c. Each of the electronic exchange server 220, market data server 225, pricing parameters server 230 may comprise one or more computing devices that include non-transitory memory for storing instructions and a processor for executing the instructions.

The electronic exchange server 220, the market data server 225, the pricing parameters server 230 may communicate with each other over networks 215a, 215b, 215c. The networks 215a, 215b, 215c may comprise the Internet, Wi-Fi connections, cellular networks or any other wired or wireless connection or network known in the art. The user devices 215a, 215b, 215c may comprise a desktop computer 210a, a laptop 210b a smartphone 210c or any other user device known in the art.

The electronic exchange server 220 may be configured to receive market data relating to a financial asset from the market data server 225. In one embodiment, the market data may be received remotely over a network 215b, while in another embodiment, the market data may be received locally. The electronic exchange server 220 may further be configured to receive pricing parameters from the pricing parameters server 230. In one embodiment, the pricing parameters may be received remotely over a network 215c, while in another embodiment the pricing parameters may be received locally.

The electronic exchange server 220 may further be configured to receive proposed order quantity data and proposed order price data for financial assets from one or more of the user devices 210a, 210b, 210c. The electronic exchange server 220 may further be configured to construct proposed trades based on received order quantity and price data. The electronic exchange server 220 may further be configured to calculate a theoretical price of a financial asset based on the received market data, pricing parameters and price data. The theoretical price of the financial asset may be calculated using the techniques and tools described above.

In one embodiment, the electronic exchange server 220 may further be configured to compare the constructed proposed trades against the calculated theoretical price. After the comparison is performed, the electronic exchange server 220 may be configured to generate and/or cause a graphical user interface to be displayed on one of the user devices 210a, 210b, 210c. That user interface may include the graphical user interface described above, and comprise a theoretical price indicator, a proposed price indicator and the market data indicators. The relative position of the proposed price indicator and the market data indicators to the theoretical price indicator may be based on the comparison performed by the electronic exchange server 220. In one embodiment, the relation of the location of the market data indicators to the theoretical price indicator may indicate the profitability of the proposed trades.

The electronic exchange server 220 may further be configured to receive a trade order from one of the user devices 210a, 210b, 210c. In one embodiment, the trade order may have been generated by a user interaction with the user interface. The electronic exchange server 220 may further be configured to execute the received trade order.

The market data server 225 may be configured to send market data to the electronic exchange server 220. Optionally, the market data server 225 may send the market data on request, while in other embodiments, the market data server 225 may provide a constant or periodic stream of market data relating to a plurality of financial assets. In one embodiment, the market data server 225 may be a part of the electronic exchange server 220. In this embodiment, the market data server 225 may communicate with the electronic exchange server 220 using internal data exchange techniques.

The pricing parameters server 230 may be configured to send pricing parameters to the electronic exchange server 220. The pricing parameters server 230 may send the pricing parameters on request, while in other embodiments, the pricing parameters server 230 may provide a constant or periodic stream of pricing parameters, reflecting live market conditions. The pricing parameters server 230 may optionally be a part of the electronic exchange server 220. In this embodiment, the pricing parameters server 230 may communicate with the electronic exchange server 220 using internal data exchange techniques.

Exemplary Method for Processing Trade Orders

Figure 3:
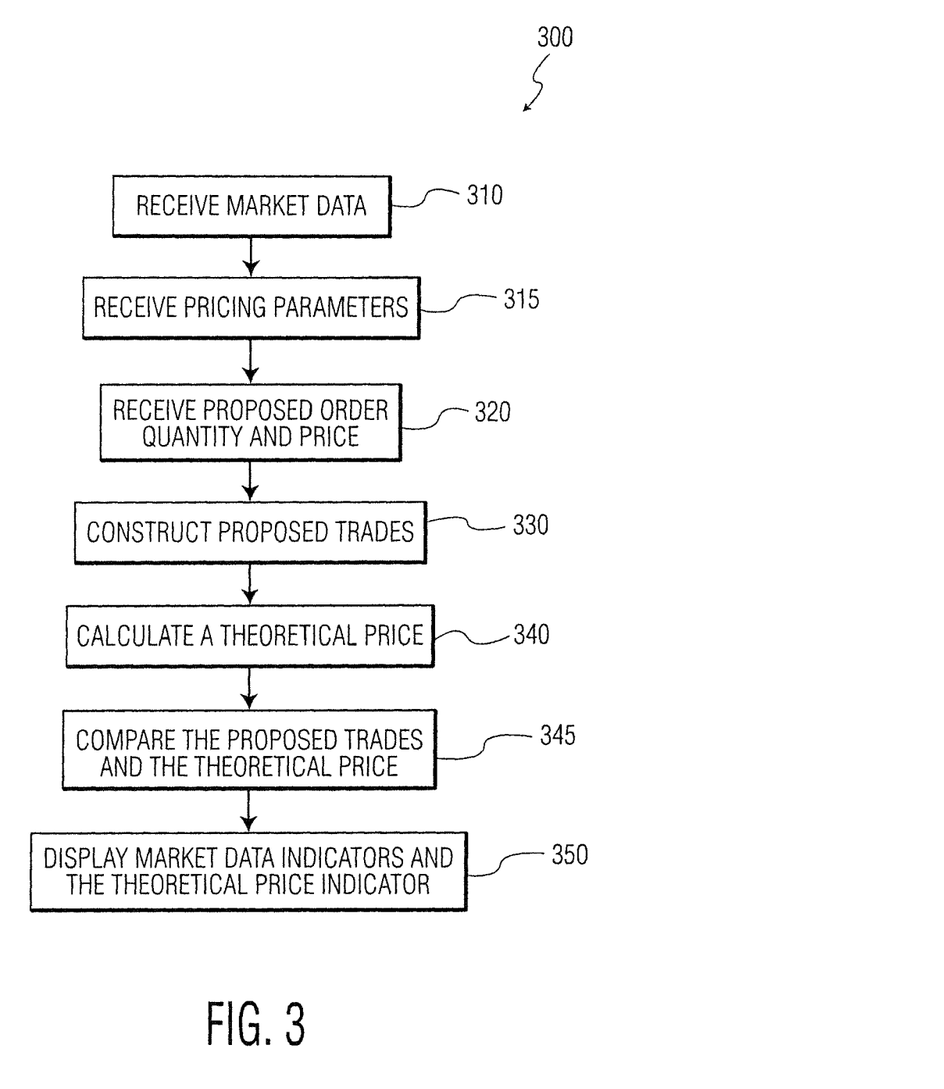
FIG. 3 is a sequence diagram illustrating an exemplary method for processing trade orders.

Turning now to FIG. 3, an exemplary method 300 for processing a trade order is shown. The method 300 of FIG. 3 demonstrates an exemplary sequence of steps performed by an electronic exchange server and/or any other properly configured computing device(s). The electronic exchange server may comprise one or more computing devices that include non-transitory memory for storing instructions and a processor for executing the instructions to perform the steps of the illustrated method 300.

At 310, the electronic exchange server may receive market data relating to a financial asset. The market data may be received remotely over a network or it may be received locally. At 315, the electronic exchange server may receive pricing parameters which may also be received remotely over a network or locally.

At 320, the electronic exchange server may receive proposed order quantity data and proposed order price data for one or more financial assets from, e.g., a user device. At 330, the electronic exchange server may construct proposed trades based on the order quantity and price data received at step 320. At 340, the electronic exchange server may calculate a theoretical price of a financial asset based on the market data, pricing parameters and price data received at steps 310, 315 and 320. The theoretical price may be calculated using the techniques described above.

At 345, the electronic exchange server may compare the proposed trades constructed at step 330 with the theoretical price calculated at step 340. At 350, the electronic exchange server may cause a theoretical price indicator, a proposed price indicator and market data indicators to be displayed via, for example, a graphical user interface. The relative position of the proposed price indicator and the market data indicators to the theoretical price indicator may be based on the comparison performed at step 345. In particular, the relative location of the proposed price indicator and the market data indicators to the theoretical price indicator may indicate the profitability of the proposed trades, Optionally, the electronic exchange server may also receive and execute trade order requests from a user device. The trade orders requests may be generated by user interactions with the electronic exchange server (e.g., via a graphical interface).

The foregoing embodiments and examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as those that are within the scope of the appended claims.

The invention claimed is:

1. A method for generating an improved dynamic graphical user interface (GUI), the method comprising:
   receiving, by a computer device, via one or more networks, a constant stream of live data reflective of live market data conditions from a plurality of third party computing devices, the computer device comprising at least one processor configured to execute computer-executable instructions stored in at least one non-transitory memory;
   generating, by the at least one processor, a graphical user interface (GUI) comprising a display window including a plurality of dynamic graphical indicators that move, within the display window, to reflect fluctuations in the constant stream of live data, and a plurality of trade buttons, within the display window, that display information reflective of the fluctuations in the constant stream of live data, wherein interaction with at least one trade button among the plurality of trade buttons automatically initiates a trade at a then-current price which is displayed in the at least one trade button,
   the plurality of dynamic graphical indicators comprising:
      a theoretical price indicator associated with a theoretical price that is calculated based on at least one proposed order price, at least one pricing parameter, and market data among the constant stream of live data for at least one type of asset traded on at least one electronic exchange, and
      one or more market data indicators displayed relative to the theoretical price indicator;
   constructing, by the at least one processor, a first proposed trade based on at least one proposed order quantity and on the at least one proposed order price;
   constructing, by the at least one processor, a second proposed trade based on the constant stream of live data reflective of live market conditions;
   positioning, by the at least one processor, the one or more market data indicators at a location within the display window relative to the theoretical price indicator such that a distance between the one or more market data indicators and the theoretical price indicator reflects a level of profitability of the first proposed trade and the second proposed trade;
   updating, by the at least one processor, a first trade button of the plurality of trade buttons to display information relating to the first proposed trade and a second trade button of the plurality of trade buttons to display information relating to the second proposed trade;
   dynamically and continuously moving, in real time, by the at least one processor, the one or more market data indicators relative to the theoretical price indicator to reflect live fluctuations in the level of profitability caused by the live fluctuations in the constant stream of live data;

dynamically and continuously updating, in real time, by the at least one processor, the second trade button to reflect live price fluctuations in the constant stream of live data, wherein interaction with the second trade button initiates a trade at a live market price; and preventing, by the at least one processor, user selection of any proposed trade displayed on the GUI that is not profitable.

2. The method of claim 1, the method further comprising:
generating, by the at least one processor, a proposed order quantity indicator and a proposed order price indicator; and displaying, by the at least one processor, the proposed order quantity indicator and the proposed order price indicator via the GUI.

3. The method of claim 1, the method further comprising:
setting the at least one proposed order price to at least one of a market bid and a market ask.

4. The method of claim 1, wherein the level of profitability indicates whether any of the first proposed trade and the second proposed trade are profitable or unprofitable.

5. The method of claim 1, wherein the location of the one or more market data indicators relative to the theoretical price indicator indicates an extent to which the first proposed trade and the second proposed trade are profitable.

6. The method of claim 1, the method further comprising:
displaying the theoretical price indicator statically in the display window of the GUI; and dynamically changing locations of the one or more market data indicators in the display window of the GUI in response to changes in the market data.

7. The method of claim 6, the method further comprising:
displaying the theoretical price indicator as a centered static mark; and displaying the one or more market data indicators as dynamic marks that move relative to the theoretical price indicator.

8. The method of claim 1, the method further comprising:
displaying changes in the location of the one or more market data indicators based on fluctuations of at least one of market bid data, market ask data, market bid volume, and market ask volume.

9. The method of claim 1, wherein the one or more market data indicators comprises at least one of market bid data, market ask data, market bid volume, and market ask volume.

10. The method of claim 1, the method further comprising:
displaying, in the display window of the GUI, the theoretical price indicator in a manner that reflects risk associated with the first proposed trade and the second proposed trade.

11. The method of claim 1, the method further comprising:
displaying, on the display window of the GUI, the theoretical price indicator as a range of values that are based on a bid/ask spread of the at least one type of asset traded on the at least one electronic exchange.

12. The method of claim 11, wherein a width of the range of values of the theoretical price indicator indicates a delta risk of the at least one type of asset traded on the at least one electronic exchange.

13. The method of claim 1, the method further comprising:

receiving, via the GUI, input that allows a user to select which of the first proposed trade and the second proposed trade will be executed.

14. The method of claim 13, the method further comprising:
receiving, via the GUI, input that allows the user to override the prevention of user selection of any trades that are not profitable.

15. The method of claim 1, the method further comprising:
highlighting, within the display window of the GUI, each of the one or more market data indicators that are associated with the first proposed trade and the second proposed trade that are profitable.

16. The method of claim 1, the method further comprising:
receiving, via the display window of the GUI, input that allows a user to select a profitable trade that does not correspond to the at least one proposed order price.

17. The method of claim 16, the method further comprising:
receiving, via the display window of the GUI, input that allows the user to select the profitable trade by selecting at least one of a live market bid or a live market ask.

18. The method of claim 1, wherein the at least one type of asset comprises at least one of an outright option, a spread option, and an option combination.

19. The method of claim 1, wherein the at least one electronic exchange comprises at least one of a commodities exchange, a futures execution facility, an options exchange, a cash equities exchange, a swap execution facility and an unregulated electronic transaction execution venue.

20. The method of claim 1, wherein the at least one pricing parameter comprises at least one of risk-free interest rate data, volatility data, time to option expiration data, skew data, kurtosis data, correlation data, interest rate data, dividend yield data, and forward price data relating to an underlying asset.

21. The method of claim 1, wherein the theoretical price indicator comprises a range of values that are based on a price of an underlying asset of the at least one type of asset, wherein the underlying asset is used as a hedge for purchase or sale of the at least one type of asset.

22. The method of claim 1, the method further comprising:
displaying, via the display window of the GUI, the theoretical price indicator as a range of values that are based on a price of an underlying asset of the at least one type of asset, wherein the underlying asset is used as a hedge for purchase or sale of the at least one type of asset.

23. A non-transitory computer-readable medium storing computer- readable instructions that, when executed by at least one processing device, causes the at least one processing device to perform the functions comprising:
receiving, via one or more networks, a constant stream of live data reflective of live market data conditions from a plurality of third party computing devices;

generating a graphical user interface (GUI) comprising a display window including a plurality of dynamic graphical indicators that move, within the display window, to reflect fluctuations in the constant stream of live data, and a plurality of trade buttons, within the display window, that display information reflective of the fluctuations in the constant stream of live data, wherein interaction with at least one trade button among the plurality of trade buttons automatically initiates a trade at a then-current price which is displayed in the at least one trade button, the plurality of dynamic graphical indicators comprising:
- a theoretical price indicator associated with a theoretical price that is calculated based on at least one proposed order price, at least one pricing parameter, and market data among the constant stream of live data for at least one type of asset traded on at least one electronic exchange, and
- one or more market data indicators displayed relative to the theoretical price indicator;

constructing a first proposed trade based on at least one proposed order quantity and on the at least one proposed order price;

constructing a second proposed trade based on the constant stream of live data reflective of live market conditions;

positioning the one or more market data indicators at a location within the display window relative to the theoretical price indicator such that a distance between the one or more market data indicators and the theoretical price indicator reflects a level of profitability of the first proposed trade and the second proposed trade;

updating a first trade button of the plurality of trade buttons to display information relating to the first proposed trade and a second trade button of the plurality of trade buttons to display information relating to the second proposed trade;

dynamically and continuously moving, in real time, the one or more market data indicators relative to the theoretical price indicator to reflect live fluctuations in the level of profitability caused by the live fluctuations in the constant stream of live data;

dynamically and continuously updating, in real time, the second trade button to reflect live price fluctuations in the constant stream of live data, wherein interaction with the second trade button initiates a trade at a live market price; and preventing user selection of any proposed trade displayed on the GUI that is not profitable.

24. The non-transitory computer-readable medium of claim 23, wherein the location of the one or more market data indicators relative to the theoretical price indicator indicates an extent to which the first proposed trade and the second proposed trade are profitable.

25. The non-transitory computer-readable medium of claim 23, wherein the functions further comprise:
displaying the theoretical price indicator statically in the display window of the GUI; and
dynamically changing locations of the one or more market data indicators in the display window of the GUI in response to changes in the market data.

26. The non-transitory computer-readable medium of claim 23, wherein the functions further comprise:
receiving, via the GUI, input that allows a user to select which of the first proposed trade and the second proposed trade will be executed.

27. The non-transitory computer-readable medium of claim 26, wherein the functions further comprise:
receiving, via the GUI, input that allows the user to override the prevention of user selection of any trades that are not profitable.

28. The non-transitory computer-readable medium of claim 23, wherein the functions further comprise:
highlighting, within the display window of the GUI, each of the one or more market data indicators that are associated with the first proposed trade and the second proposed trade that are profitable.

* * * * *